Oct. 18, 1955 MOTOAKI YOKOI 2,720,872
TWO CYCLE INTERNAL COMBUSTION ENGINES
Filed Jan. 30, 1953 5 Sheets-Sheet 1

Inventor,
Motoaki Yokoi,
by Joseph Y. Houghton
Attorney.

Oct. 18, 1955  MOTOAKI YOKOI  2,720,872
TWO CYCLE INTERNAL COMBUSTION ENGINES
Filed Jan. 30, 1953   5 Sheets-Sheet 2

Inventor,
Motoaki Yokoi,
by Joseph Y. Houghton
Attorney.

Oct. 18, 1955　　　MOTOAKI YOKOI　　　2,720,872
TWO CYCLE INTERNAL COMBUSTION ENGINES
Filed Jan. 30, 1953　　　　　　　　　　　　5 Sheets-Sheet 4

Inventor,
Motoaki Yokoi,
by Joseph Y. Houghton
Attorney

Oct. 18, 1955  MOTOAKI YOKOI  2,720,872
TWO CYCLE INTERNAL COMBUSTION ENGINES
Filed Jan. 30, 1953  5 Sheets-Sheet 5

Inventor,
Motoaki Yokoi,
by Joseph J. Houghton
Attorney.

United States Patent Office 2,720,872
Patented Oct. 18, 1955

2,720,872

TWO CYCLE INTERNAL COMBUSTION ENGINES

Motoaki Yokoi, Nishinomiya City, Japan

Application January 30, 1953, Serial No. 334,207

1 Claim. (Cl. 123—65)

The present invention relates to two cycle internal combustion engines. It relates particularly to that type of two cycle internal combustion engines in which the scavenging ports and exhaust ports are so arranged circumferentially of the cylinder wall near the inner dead point that they may, in whole or in part, attain nearly the same height.

The object of this invention is to provide means for improving the actions of the exhaust, scavenging and supercharging portions of the engine, to thereby increase its efficiency.

With this object in view, the present invention provides a two cycle internal combustion engine of the type in which the scavenging ports and exhaust ports are arranged on the cylinder wall near the inner dead point with the scavenging ports and the second stage exhaust ports arranged on nearly the same circumferential part of the cylinder wall; particularly characterized in that the first stage exhaust ports are arranged to be uncovered earlier than the scavenging ports as the piston nears the end of its explosion stroke, and in that the discharge passage for the so arranged first stage exhaust ports is provided with a control valve coordinated with the reciprocation of the piston and arranged to specially facilitate the reduction of cylinder pressure before the scavenging ports are open even when the engine is operating at high speed.

In a known two cycle internal combustion engine of the type improved by the present invention (which is illustrated in Figs. 8 and 9 hereinafter described), the exhaust ports and the second stage scavenging ports are arranged on nearly the same circumferential part of the cylinder wall, but the first stage scavenging ports are arranged to be uncovered earlier than the exhaust ports by the piston at the end of its explosion stroke. In such known engine the inlet to the first stage scavenging ports is surrounded in air-tight manner by a casing provided in the scavenging air reservoir of the second stage scavenging ports, and non-return valves are mounted on the casing, or a rotary control valve is installed in the said passage so as to let air flow from the air reservoir into the cylinder.

In this known engine, the first stage scavenging ports being uncovered by the piston earlier than the exhaust ports at the explosion stroke, the exhaust gas in the cylinder expands into the casing and non-return valves through the first stage scavenging ports. Hence, when the exhaust ports are uncovered by the piston, the exhaust gas in the cylinder flows through these exhaust ports relatively slowly, because the exhaust gas has already expanded from the cylinder to the passage of the first stage scavenging ports, and the casing and non-return valves associated therewith. Therefore, in the known engine the scavenging air has to sweep back into the cylinder the exhaust gas filling the said passage, casing and non-return valves before it flows into the cylinder. And since the volume of the exhaust gas filling the said parts is quite large compared with that in the cylinder, while such parts also have comparatively complicated constructions that impede flow of gas therethrough, the scavenging action is not only difficult and imperfect, but also delayed. Moreover, the non-return valves in the known engine offer resistance to the flow of the scavenging air into the cylinder, and the return control valve has the disadvantage of being subjected to the high temperature and pressure of the exhaust gas flowing back to it at the commencement of the opening of the first stage scavenging ports, as well as to the high pressure of the air at the starting of the engine. Furthermore, with respect to the supercharging, the air flow is subjected to the resistance of the non-return valves and the casing, and thus loses so much of its kinetic energy that the efficiency of supercharging becomes very low. For these reasons, a comparatively large quantity of high pressure scavenging air is required in order to secure purity and a sufficient degree of supercharging and this requirement increases so rapidly with increase of the engine speed, that the power employed for the supply of the scavenging air is correspondingly much increased, reducing the efficiency of the engine and limiting its use at higher speeds. To summarize, the known two cycle internal combustion engine of the above-mentioned type has various disadvantages as regards its exhaust, scavenging and supercharging operations.

However, according to the present invention, the first stage exhaust ports with large port area are uncovered earlier than the scavenging ports by the piston at the end of its explosion stroke, at a time when the discharge passage from the said exhaust ports has been already opened by the control device. In this connection it will be noted that, as hereinafter described, the control valve is located, not in the exhaust passage, but in the open or enlarged exhaust space beyond the end of the exhaust passage, and the construction of the device, combined with such location, allows free expansion of the gases past the control valve. Hence the exhaust gas in the cylinder so immediately and rapidly exhausts through these ports that the pressure of the exhaust gas retained in the cylinder decreases to a high degree before opening of the scavenging ports even when the engine is operating at high speed. The discharge passage, which, as noted is already opened by the control device when the piston uncovers the first stage exhaust ports, continues open until the piston comes to the inner dead point, and then is throttled or closed by the control device as the piston is returning and covering the second stage exhaust ports. As mentioned, since the scavenging ports are uncovered by the piston only after substantial flow of the exhaust gas from the cylinder through the first stage exhaust ports, the pressure of the exhaust gas retained in the cylinder is very low when the scavenging air flows into the cylinder through the scavenging ports. Hence, very little resistance is offered to the flow of the scavenging air into the cylinder and the scavenging action is performed more quickly and perfectly.

At the compression stroke, the discharge passage from the first stage exhaust ports is closed by the control device as the second stage exhaust ports are being covered by the piston, that is, the closing of the first stage exhaust ports by the control device and the closing of the second stage exhaust ports by the piston occur at the same time, so that the closing of these ports is very rapidly performed. Furthermore, as the scavenging ports are closed only by the piston, the kinetic energy of the scavenging air can be utilized to aid the supercharging, owing to the difference in time between the closing of the scavenging ports by the piston and the closing of the exhaust ports by the piston and the control device. And, if desired, at the moment these exhaust ports are completely closed, the scavenging ports being in part still uncovered by the piston, the supercharging also can be effected by the scavenging air pressure. Furthermore, the passage of the first stage exhaust ports being opened by the control device when these ports are uncovered by the piston, the device is not subjected to the high pressure of the exhaust gas and starting air, so that the device does not require high strength.

Thus, according to the present invention, not only is the exhaust, scavenging and supercharging facilitated and improved, but also the rate of flow of the exhaust gas and the scavenging air is so high and the rate of closing of the exhaust ports is so rapid that the kinetic energy of the gases can be utilized to the utmost, a factor of especial importance in the case of high speed engines.

The accompanying drawings illustrate by way of example, one manner in which the invention may be carried into practice. In these drawings.

Figure 1:
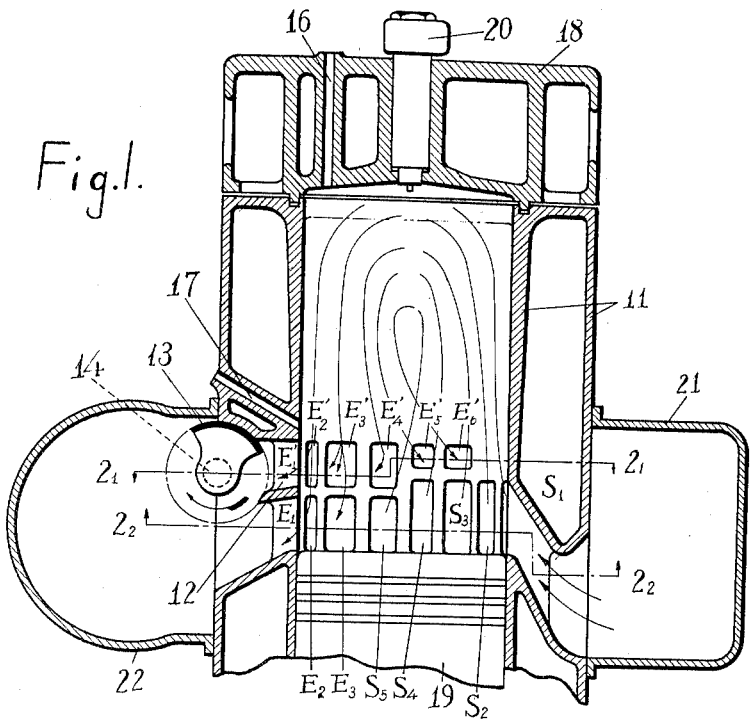
Figure 1 is a sectional elevation of a portion of a two cycle single acting internal combustion engine provided with the present invention.
Figure 2:
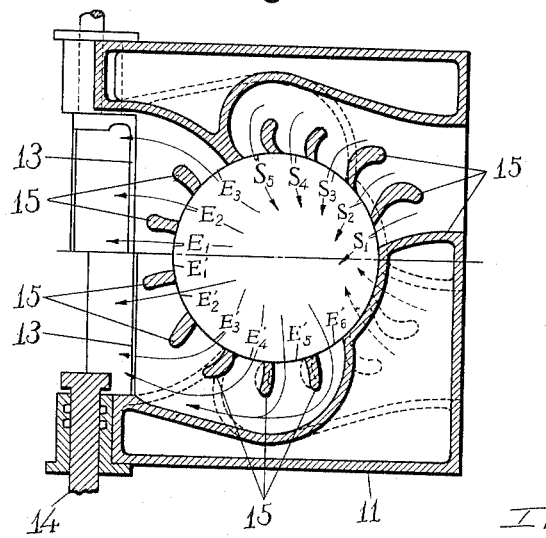
Figure 2 is a sectional plan view, of which the lower half is a sectional plan on the line $2_1$—$2_1$ of Figure 1, the upper half being a section on the line $2_2$—$2_2$ of Figure 1.
Figure 3:
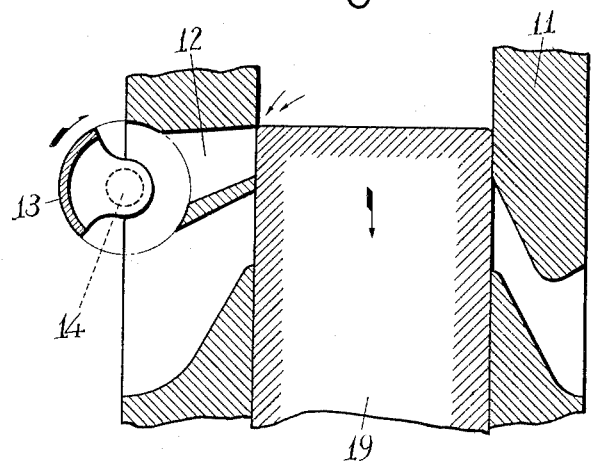
Figures 3, 4, 5 and 6 are diagrammatic sectional views showing the relative motions of the piston and a control device.
Figure 4:
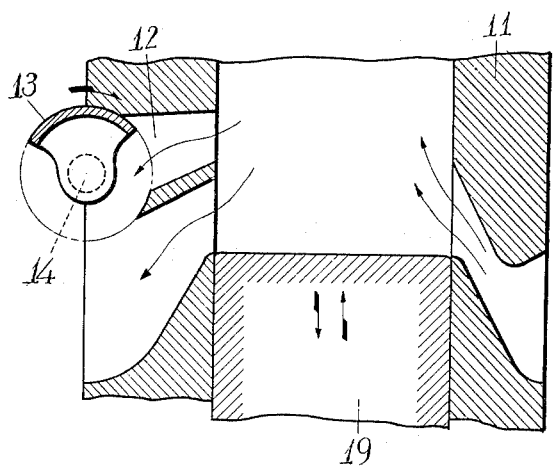
Figure 5:
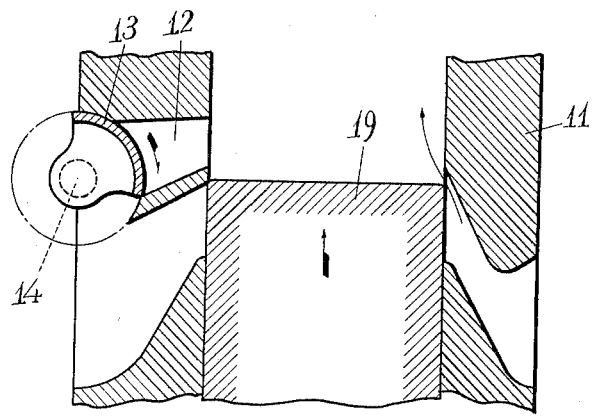
Figure 6:
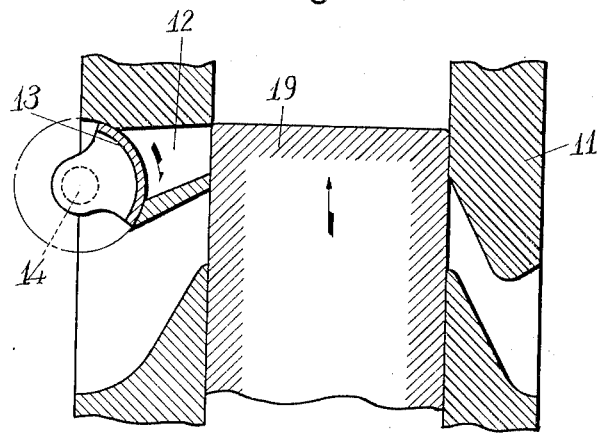
Figure 7:
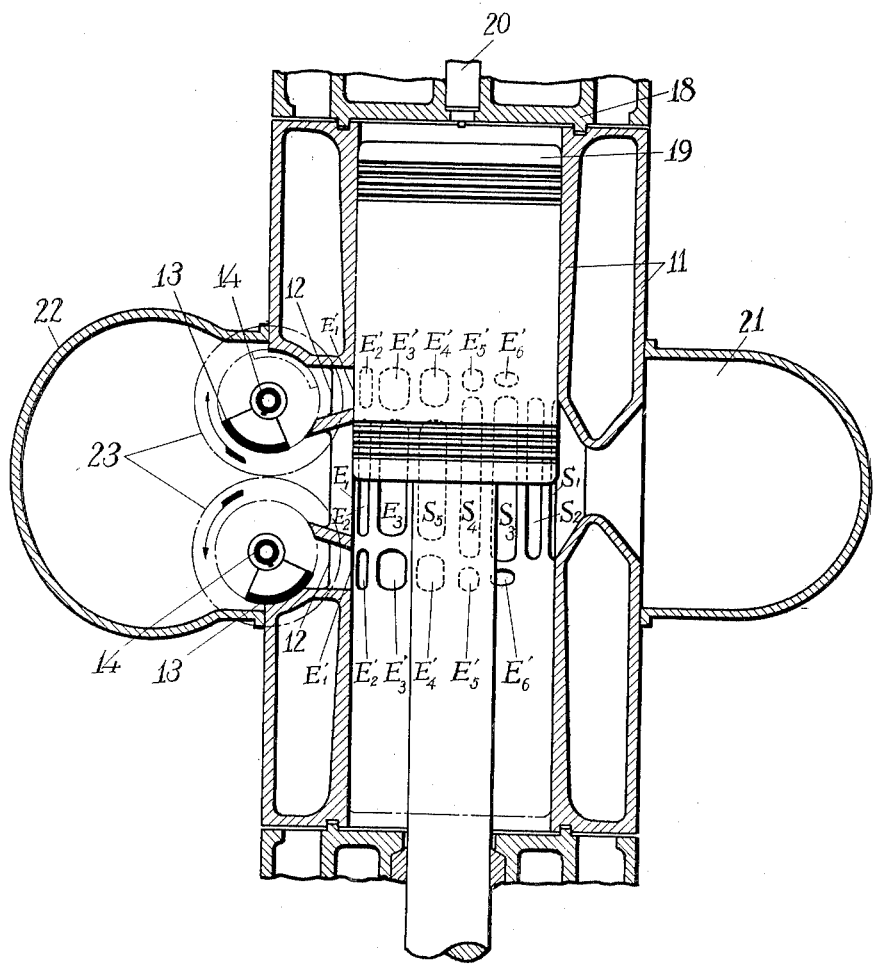
Figure 7 is a sectional elevation of a piston of a two cycle double acting internal combustion engine provided with the present invention.

Referring to Figures 1 and 2, scavenging ports $S_1$, $S_2$, $S_3$, $S_4$, $S_5$, and the second stage exhaust ports $E_1$, $E_2$, $E_3$ are arranged on nearly the same circumferential part of the cylinder wall 11, and the first stage exhaust ports $E'_1$, $E'_2$, $E'_3$, $E'_4$, $E'_5$ and $E'_6$ are arranged on nearly the same circumferential part of the same, but slightly outwardly displaced relative to the said scavenging and second stage exhaust ports. The discharge passage 12 from the first stage exhaust ports is provided with a rotary control valve 13 at its mouth, i. e. the valve is not located intermediate the length of the discharge passage, but is in the enlarged or open exhaust space beyond the mouth of the discharge passage. This valve is in the form of an acute angle segment of a completely hollow cylinder and is mounted on stub shafts 14 driven by the crank shaft of the engine by means of gears or a chain. Thus when the valve is open there is no obstruction to the free expansion of the gases from the short, substantially straight, radially extending fan-shaped discharge passage directly into the exhaust space 22, that has a cross sectional area over twice that of the mouth of the discharge passage, and the gases are not caused to make any sharp turn in passing thereto. Guide ribs 15 of the scavenging and exhaust ports are shaped so as to guide the scavenging air and exhaust gas in suitable directions. Holes 16 and 17 are drilled in the cylinder head 18 and cylinder wall 11 so that indicator means may be inserted. Reference numerals 19, 20, 21 and 22 indicate the piston, fuel valve, scavenging air reservoir and exhaust pipe respectively. The exhaust ports $E'_5$ and $E'_6$ may be omitted, and the scavenging ports $S_5$ may be substituted by an exhaust port, and also the said scavenging and exhaust ports may be arranged in an asymmetrical manner. In a double acting engine, as shown in Figure 7, the first stage exhaust ports $E'_1$, $E'_2$, $E'_3$, $E'_4$, $E'_5$ and $E'_6$ are arranged outwardly of the second stage exhaust ports $E_1$, $E_2$, $E_3$ and scavenging ports $S_5$, $S_4$, $S_3$, $S_2$, $S_1$ and each discharge passage 12 of these first stage exhaust ports is provided with a rotary control valve 13 respectively, these valves being cooperatively related to each other by interengaging gears 23, 23 of equal diameter.

Figure 8:
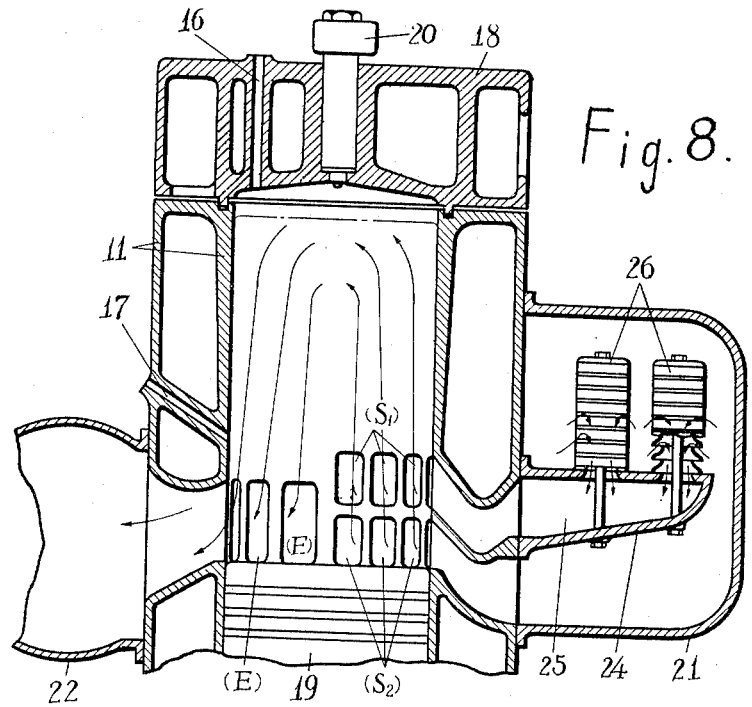
Figure 8 is a sectional elevation of a portion of a known two cycle single acting internal combustion engine of the type improved by the present invention.
Figure 9:
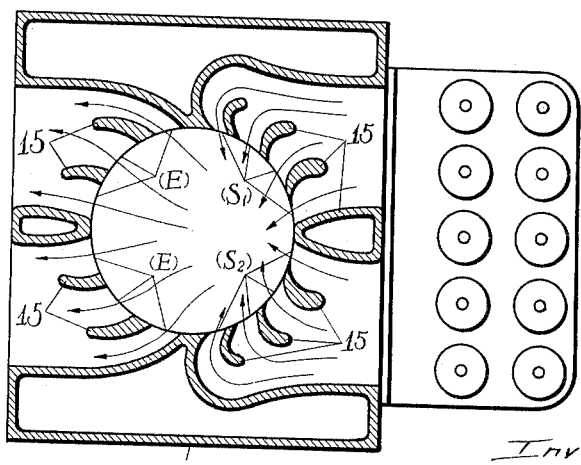
Figure 9 is a sectional plan view on the line 9—9 of Figure 8.

Referring to Figures 8 and 9 showing a known two cycle single acting internal combustion engine of the type improved by the present invention, the exhaust ports E and the second stage scavenging ports $S_2$ are arranged on nearly the same circumferential part of the cylinder wall 11, but the first stage scavenging ports $S_1$ are arranged slightly outwardly of the exhaust ports E and thus are uncovered earlier than the exhaust ports by the piston at its explosion stroke. A scavenging air reservoir 21 is provided with a casing 24 so as to enclose the inlet passage 25 to the first stage scavenging ports $S_1$ in airtight manner, and non-return valves 26 are fixed on the casing.

The particular embodiment of my invention which I have illustrated and described is to be construed as a typical form and not an exclusive one, and the details of construction may be modified, as by means of mechanical equivalents and the like, without departing from the spirit of my invention and the scope of the claim.

Having thus described my invention, what I claim is:

A two-cycle internal combustion engine of the type having a piston reciprocating in a cylinder, scavenging ports and exhaust ports in the cylinder wall and uncovered by the piston near the end of its firing stroke, first stage exhaust ports uncovered by the piston prior to the uncovering of the other ports, an exhaust space with which said exhaust ports and first stage exhaust ports communicate, and valve means for closing the first stage exhaust ports at the beginning of the compression stroke of the piston prior to the closing of said scavenging ports; particularly characterized in that the first stage exhaust ports have a short, substantially straight, radially extending fan-shaped discharge passage leading therefrom directly to the exhaust space, in that said exhaust space has a cross sectional area over twice that of the end of the discharge passage proximate thereto, in that said valve means comprises a rotary valve in the form of an acute angle segment of a hollow cylinder mounted on stub shafts, and in that said rotary valve is mounted in said exhaust space beyond the end of said discharge passage so that in one position thereof it closes the end of said discharge passage while on its rotation to a position opening said discharge passage it lies in the open exhaust space so that the exhaust gases exiting from said exhaust passage undergo no sharp change of direction and encounter no restriction in their expansion into said exhaust space.

References Cited in the file of this patent

UNITED STATES PATENTS

| | | |
|---|---|---|
| 1,514,476 | Still | Nov. 4, 1924 |
| 1,702,875 | Magdeburger | Feb. 19, 1929 |
| 1,744,249 | Trechsel | Jan. 21, 1930 |
| 1,887,661 | Pielstick | Nov. 15, 1932 |
| 2,076,976 | Burn | Apr. 13, 1937 |

FOREIGN PATENTS

| | | |
|---|---|---|
| 282,930 | Germany | Mar. 26, 1915 |
| 917,340 | France | Sept. 9, 1946 |